(12) United States Patent
Schugren et al.

(10) Patent No.: US 10,102,765 B2
(45) Date of Patent: *Oct. 16, 2018

(54) INTERNET-BASED EDUCATIONAL FRAMEWORK FOR THE CORRELATION OF LESSONS, RESOURCES AND ASSESSMENTS TO STATE STANDARDS

(71) Applicant: EdGate Correlation Services, LLC, San Diego, CA (US)

(72) Inventors: Sandra Schugren, Port Orchard, WA (US); Mark Mitrovich, Naperville, IL (US); Benjamin Beasley, Naperville, IL (US); Richard E. Nangle, Chandler, AZ (US)

(73) Assignee: EdGate Correlation Services, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/682,925

(22) Filed: Aug. 22, 2017

(65) Prior Publication Data
US 2018/0025660 A1    Jan. 25, 2018

Related U.S. Application Data

(63) Continuation of application No. 15/159,042, filed on May 19, 2016, now Pat. No. 9,741,260, which is a continuation of application No. 14/809,658, filed on Jul. 27, 2015, now Pat. No. 9,373,264, which is a continuation of application No. 14/057,545, filed on Oct. 18, 2013, now Pat. No. 9,092,990, which is a continuation of application No. 10/041,655, filed on Jan. 8, 2002, now Pat. No. 8,632,340.

(51) Int. Cl.
  G09B 7/00    (2006.01)
  G09B 7/02    (2006.01)
  G09B 5/00    (2006.01)

(52) U.S. Cl.
  CPC .............. *G09B 7/00* (2013.01); *G09B 5/00* (2013.01); *G09B 7/02* (2013.01)

(58) Field of Classification Search
  CPC .................................................. G09B 19/0053
  See application file for complete search history.

(56) References Cited

U.S. PATENT DOCUMENTS 4,967,354 A    10/1990    Buchanan
5,201,047 A    4/1993    Maki et al.
(Continued)

OTHER PUBLICATIONS

Information from the internet on Putman Valley School District; [Internet] [retrieved on Feb. 28, 2002].
(Continued)

*Primary Examiner* — Omkar Deodhar
(74) *Attorney, Agent, or Firm* — Winstead PC

(57) ABSTRACT

An apparatus assists educators in selecting achievement tools to meet an applicable one of a plurality of sets of educational standards. A first table holds a plurality of educational standards and a plurality of linked keywords. A second table holds a plurality of achievement tools, such as lesson plans, assessments and resources, and a plurality of linked keywords. A table manipulator program permits an educator to select an educational standard and shows achievement tools applicable to the selected educational standard by having a matching of keywords linked to the achievement tools to keywords linked to the educational standards.

20 Claims, 13 Drawing Sheets

(56) References Cited

U.S. PATENT DOCUMENTS

| | | |
|---|---|---|
| 5,544,360 A | 8/1996 | Lewak et al. |
| 5,715,444 A | 2/1998 | Danish et al. |
| 5,787,417 A | 7/1998 | Hargrove |
| 5,802,524 A | 9/1998 | Flowers et al. |
| 5,810,605 A | 9/1998 | Siefert |
| 5,823,789 A | 10/1998 | Jay et al. |
| 5,829,983 A | 11/1998 | Koyama et al. |
| 5,870,744 A | 2/1999 | Sprague |
| 5,897,639 A | 4/1999 | Greef et al. |
| 5,978,648 A | 11/1999 | George et al. |
| 6,018,730 A | 1/2000 | Nichols et al. |
| 6,038,668 A | 3/2000 | Chipman et al. |
| 6,041,326 A | 3/2000 | Amro et al. |
| 6,070,158 A | 5/2000 | Kirsch et al. |
| 6,081,251 A | 6/2000 | Sakai et al. |
| 6,092,081 A | 7/2000 | Alpert et al. |
| 6,120,299 A | 9/2000 | Trenholm et al. |
| 6,270,351 B1 | 8/2001 | Roper |
| 6,282,404 B1 | 8/2001 | Linton |
| 6,507,726 B1 | 1/2003 | Atkinson et al. |
| 6,561,812 B1 | 5/2003 | Burmester et al. |
| 2002/0042687 A1 | 4/2002 | Tracy et al. |
| 2003/0017442 A1 | 1/2003 | Tudor et al. |
| 2003/0039949 A1 | 2/2003 | Cappellucci et al. |
| 2003/0044762 A1 | 3/2003 | Bergan et al. |
| 2003/0049592 A1 | 3/2003 | Park |
| 2003/0050935 A1 | 3/2003 | Spetsmann |
| 2003/0078934 A1 | 4/2003 | Cappellucci et al. |
| 2003/0113697 A1 | 6/2003 | Plescia |
| 2003/0207245 A1 | 11/2003 | Parker |
| 2004/0002051 A1 | 1/2004 | Crilly |

OTHER PUBLICATIONS

Information from the internet on EdVision; [Internet] [retrieved on Feb. 28, 2002].

Information from the internet on McRel; [Internet] http://mcrel.org/standards-benchmenarks/index.asp and linked pages [retrieved on Feb. 28, 2002].

Information about the Flying Rhinoceros program; (fax dated Aug. 11, 1999).

INTERNET-BASED EDUCATIONAL FRAMEWORK FOR THE CORRELATION OF LESSONS, RESOURCES AND ASSESSMENTS TO STATE STANDARDS

CROSS-REFERENCE TO RELATED APPLICATIONS

This application is a continuation of U.S. patent application Ser. No. 15/159,042, filed May 19, 2016. U.S. patent application Ser. No. 15/159,042 is a continuation of U.S. patent application Ser. No. 14/809,658, filed Jul. 27, 2015. U.S. patent application Ser. No. 14/809,658 is a continuation of U.S. patent application Ser. No. 14/057,545, filed Oct. 18, 2013. U.S. patent application Ser. No. 14/057,545 is a continuation of U.S. patent application Ser. No. 10/041,665, filed Jan. 8, 2002. U.S. patent application Ser. No. 14/809, 658, U.S. patent application Ser. No. 15/159,042, U.S. patent application Ser. No. 14/057,545, and U.S. patent application Ser. No. 10/041,665 are hereby incorporated by reference.

BACKGROUND OF THE INVENTION

State-mandated educational regulations require approximately 1,500 hours of curriculum be taught in the 1,200 (or fewer) instructional hours contained in the typical school year. This discrepancy makes it difficult for teachers to find the time to plan and teach. In addition, teachers need to balance testing requirements with real world preparation. With all these demands, teachers excel when they inject their own vision of teaching into the classroom.

Every state in the United States (with the exception of Iowa) has developed a set of standards that are the basis for state testing of students. State websites offer the standards. However, these are generally not in a searchable database and do not provide teachers with what they need most: an easy way to access state standards, to view them in the context of the curriculum that they can teach to students and to have the ability to add their own instructional materials to the standards. Teachers also need a way to evaluate the importance of each standard based on the occurrence on state tests and on to relevant life-long skills required of most students.

Existing internet-based systems allow the user to do one or more of the following:
1) Display a lesson and then, through a series of selections, see generically formatted state standards that relate to that lesson OR
2) Query a search engine for a lesson or activity, which is based on specific grade level and subject only and not associated with any state standards OR
3) Submit lessons and activities to a database that is not correlated to state standards or if they are it is, as an adjunct to the process, rather than the key element of the submission OR
4) View subject specific lessons OR
5) View selected standards that have aligned "for fee" resources.

Accordingly there is a need in the art to provide educators with achievement tools (lessons, assessments and resources) correlated to educational standards, in a convenient, easy to use form with multiple "achievement tools" easily added from diverse sources.

SUMMARY OF THE INVENTION

The present invention fulfills this need in the art by providing an apparatus for assisting educators in selecting achievement tools for use in the education of students to meet an applicable one of a plurality of sets of educational standards. A first table holds a plurality of educational standards and a plurality of keywords, at least selected ones of the keywords being linked to selected ones of the educational standards. A second table holds a plurality of achievement tools and a plurality of keywords, at least selected ones of the keywords being linked to selected ones of the achievement tools. A table manipulator program permit an educator to select an educational standard and provides the educator a set of achievement, tools applicable to the selected educational standard by having a matching of keywords linked to the achievement tools to keywords linked to the educational standards.

Preferably, the keywords include grade level indicators.

Typically, the achievement tools are selected from the group consisting of lesson plans, assessments and resources and more than one of them.

The educational standards may be defined by discrete jurisdictions to apply to educational processes within those jurisdictions. Preferably, when the educational standards of one jurisdiction have similarities to the educational standards of a different jurisdiction, the keywords for such similar educational standards are the same.

Some of the achievement tools in the second table may be generated by educators in diverse jurisdictions having differing educational standards. Preferably, when an educational tool is submitted by an educator for an educational standard, keywords for that standard are automatically associated with the submitted educational tool. However, the apparatus may include means that are provided for the revision of keywords to a submitted educational tool subsequent to submission.

In a preferred embodiment the apparatus includes a data entry means for permitting a user of the apparatus to input a rating for achievement tools and for storage of the input rating for display in association with the rated educational tool.

Typically, the first table, second table and table manipulator program are provided to educators over the Internet. The apparatus may include a user interface that enables an administrator to select only educational standards pertinent to a user for use by the user.

Preferably a user interface enables a user to log in with a unique identifier, and the user is provided only educational standards pertinent to that user. In one embodiment, the educational standards are defined by discrete jurisdictions to apply to educational processes within those jurisdictions and the user interface enables a user to log in with a unique identifier indicating an affiliation with one of the jurisdictions and so that the user is provided only educational standards pertinent to that jurisdiction.

The apparatus may include an administrative system which allows the addition and modification of local learning standards to the state standards. The apparatus may include a lesson plan builder that contains data entry fields, the ability to add active links to web sites and data files, searching features for appropriate standards, and an electronic rubric creator. The apparatus may include a search facility permitting searching by grade, subject, by selecting from a predefined list of keywords or by typing in a word or phrase to be searched.

The invention also provides a method of assisting educators in selecting achievement tools for use in the education of students to meet an applicable one of a plurality of sets of educational standards including linking a plurality of educational standards and a plurality of keywords, linking a plurality of achievement tools and a plurality of keywords, and linking educational standards to achievement tools by matching keywords linked to the achievement tools to keywords linked to the educational standards.

In the method, the achievement tools are typically selected from the group consisting of lesson plans, assessments and resources and more than one of them. Typically, the educational standards are defined by discrete jurisdictions to apply to educational processes within those jurisdictions. If the educational standards of one jurisdiction have similarities to the educational standards of a different jurisdiction and the keywords linked to similar educational standards may be the same.

The method may include adding achievement tools generated by educators in diverse jurisdictions having differing educational standards. As an educational tool is added by an educator for an educational standard, the method may include automatically linking keywords for that standard to the added educational tool. In addition, the method may include revising the keywords to an added educational tool subsequent to its addition.

The method may also include rating achievement tools and storing rating for display in association with the rated educational tool.

Preferably, the linked educational standards and achievement tools are made available over the Internet. A user may be allowed to log in with a unique identifier, and provided only educational standards pertinent to that user.

Typically, the educational standards are defined by discrete jurisdictions to apply to educational processes within those jurisdictions. The method may enable a user to access the linked educational standards and achievement tools with a unique identifier indicating an affiliation with one of the jurisdictions and filter the information provided to the user so that the user is provided only educational standards pertinent to that jurisdiction.

The method may include adding to or modifying local learning standards to the state standards.

The method may include building a lesson plan including adding active links to web sites and data files, searching features for appropriate standards, and creating a rubric.

The method may also include searching the linked educational standards and achievement tools including searching by grade, subject, by selecting from a predefined list of keywords or by typing in a word or phrase to be searched.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
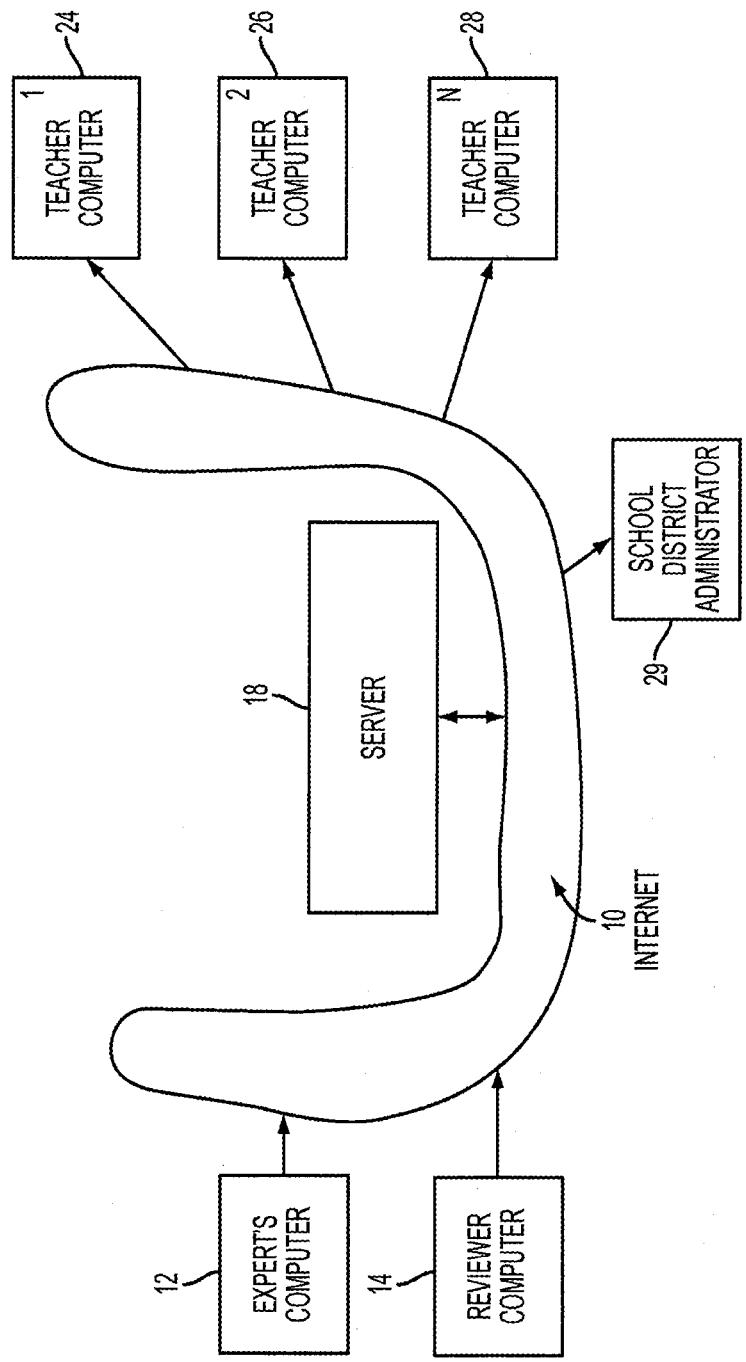
FIG. 1 is a schematic view of the operability of the preferred embodiment as implemented on the Internet.

The invention is most useful when implemented on a network, such as the Internet. As seen in FIG. 1, a server 18 accessible on the Internet 10 is currently the best mode of practicing the invention. However, various other distributed architectures could also be adopted. The Internet 10 makes available to a plurality of teachers via their computers 24, 26 and 28 information stored on the server 18. School district or other administrators may also access the server 18 over the Internet 10 to using their respective computers 29. Others accessing the server 18 include reviewers having their own computers 14 and experts with their computers 12. As depicted in FIG. 1, the computers are connected to the server 18 over the Internet, but any other network configuration could be suitable including local area networks or the like. As bandwidth increases, wireless applications may also ensue.

The various users access the system on the server 18 as a web page in conventional fashion, with links from another web page, using a favorites program, directly typing in a URL (Uniform Resource Locator), or the like.

Hardware and Software Requirements

The Applicant's commercial embodiment can be used with either a PC or a Macintosh computer with an Internet connection and current Web browser. A modem or other Internet connection of at least 28.8 bps is required. For the Web browser, Microsoft Internet Explorer, Version 5.0 (or higher) or Netscape Navigator, Version 4.7. may be used. Other browsers may be substituted. A minimum screen size of 800×600 is recommended.

In addition, software to open and use selected achievement tools may be needed. For example, if an assessment tool is in PDF format, Adobe Acrobat Reader may be needed.

Figure 2:
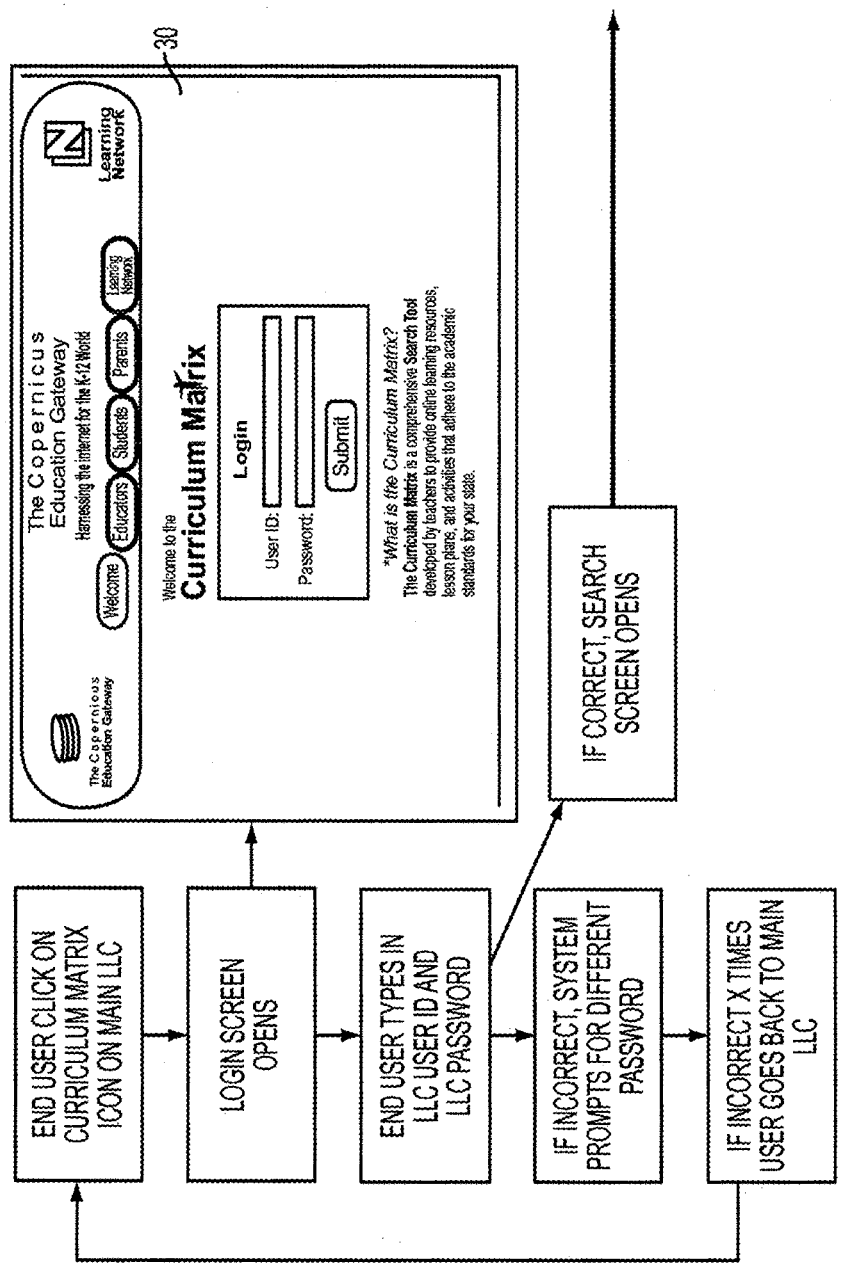
FIGS. 2-10 are flow charts of processing illustrating the use of the preferred embodiment with screen shots.

FIG. 2 shows a Log In screen 30 available to a user such as teacher 24 upon first encountering the web site. The user can enter his or her user id and password and submit this information to the server 18 for comparison with stored user id and password information for the various authorized users on the system. Of course, conventional sign up procedures to obtain such authorizations can be part of the system and are not included in this discussion for the sake of simplicity. Sign up and security procedures are well known and need no detailing here. Assuming a log in and identification is correct, the user is then displayed a search screen 40, which is shown in FIG. 3 along with flow chart information illustrating the use of the search screen.

Searching

Figure 3:
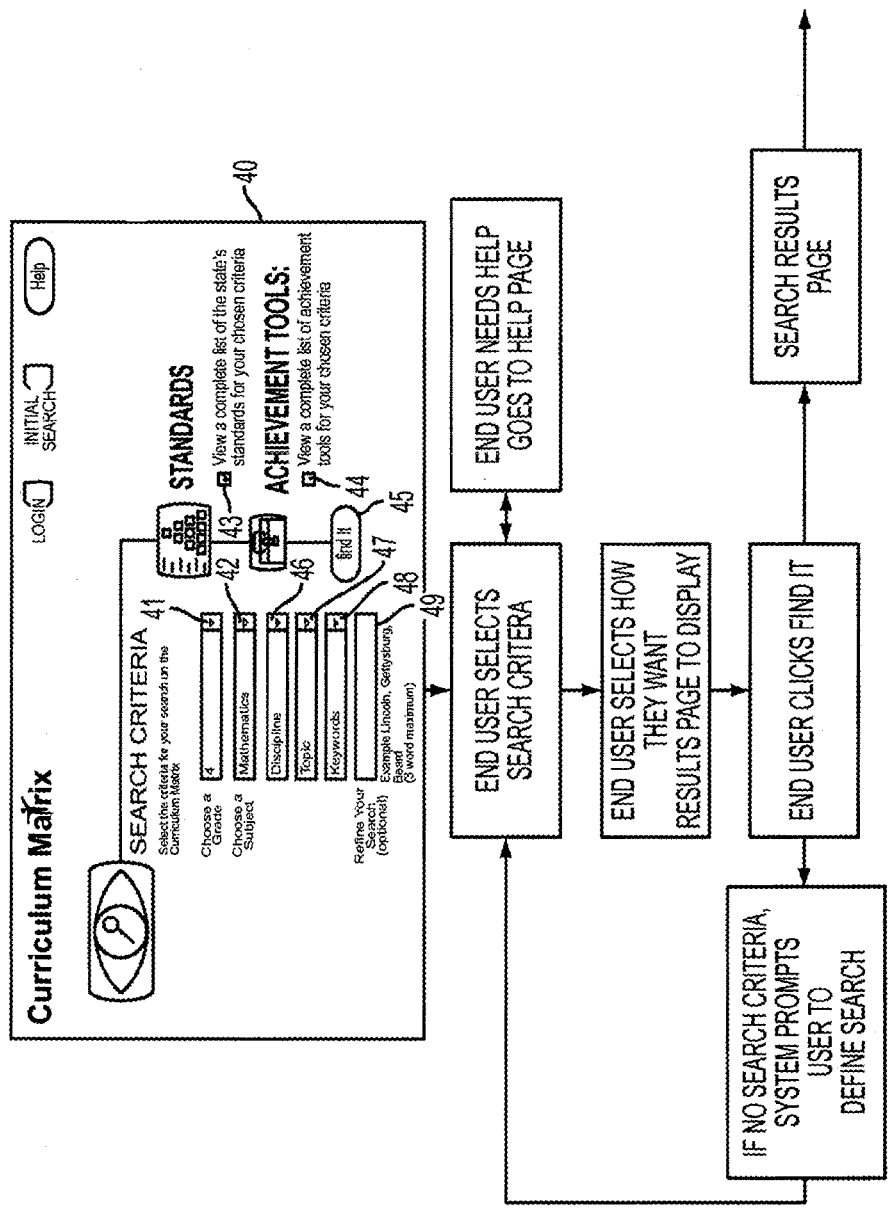

As seen in FIG. 3 the Search screen 40 functions as a gateway to various state standards and associated lessons, assessments and resources. Lessons, assessments and resources are collectively referred to herein as achievement tools. There are three basic methods for conducting a search: 1) by typing grade and subject; 2) by selecting from a predefined list of keywords; or 3) by typing in a user-selected word or phrase. In addition, in the preferred embodiment, a user must select a grade and subject in order to conduct any search. This assists an educator in finding material appropriate for his or her class level.

Searching by Grade and Subject

On the Search Page 40, a user may click on a drop down icon 41 next to the Grade field to select a grade. Similarly, one may click on the drop down icon 42 to choose a subject. If the user checks off the standards box 43, the search results will display standards that reflect the grade and subject specified. There may be some states that do not have standards for a specific subject or for every grade level.

If the user opts for Achievement Tools 44, the search results will display the achievement tools for the grade and subject identified. Achievement tools are lessons, assessments or resources. Once the user has completed the search criteria he or she may click on a Find It button 45 to begin the search.

Searching by Keyword

Searching by Keyword allows a greater degree of refinement for a search. On the Search Page 40, the user clicks on the drop down icon 41 next to the Grade field to select a grade. Similarly, a click on the drop down icon 42 permits a choice of subject in the Subject field. A similar drop down icon 46 in the Discipline field permits selection of a discipline within the subject, and a drop down icon 47 permit further refinement. A search term may also be entered in box 49. In the Keyword field 48, a user may select a keyword that most closely matches his or her specific query. Not all topics contain keywords, so this field may be blank. Next, the user checks off the box for the results wanted: either standards 43 or achievement tools 44 located on the right side of the Search Page 40. If the user opts for Achievement Tools, the search results will display the achievement tools for the grade, subject and keywords requested. The user Clicks on "Find It" 45 to begin the search. The searching algorithm checks for stored achievement tools labeled with fields matching the 25 selected search criteria.

NOTE: Once the user has selected a grade and subject, the system resets the search before the user selects each subsequent search field. During this time, the program automatically plugs in the relevant sublist for the discipline, based on the grade and subject selected. If the user selects a discipline, the system provides a list of keywords (if there are any) for completing the Keyword field. Once the data is indicated, the user may click on the "Find It" button 45 to signal to the server 18 to prepare and display the search results, which are directed to the user's computer 24. The display for the search results appears as screen 50 seen in FIG. 4.

Figure 4:
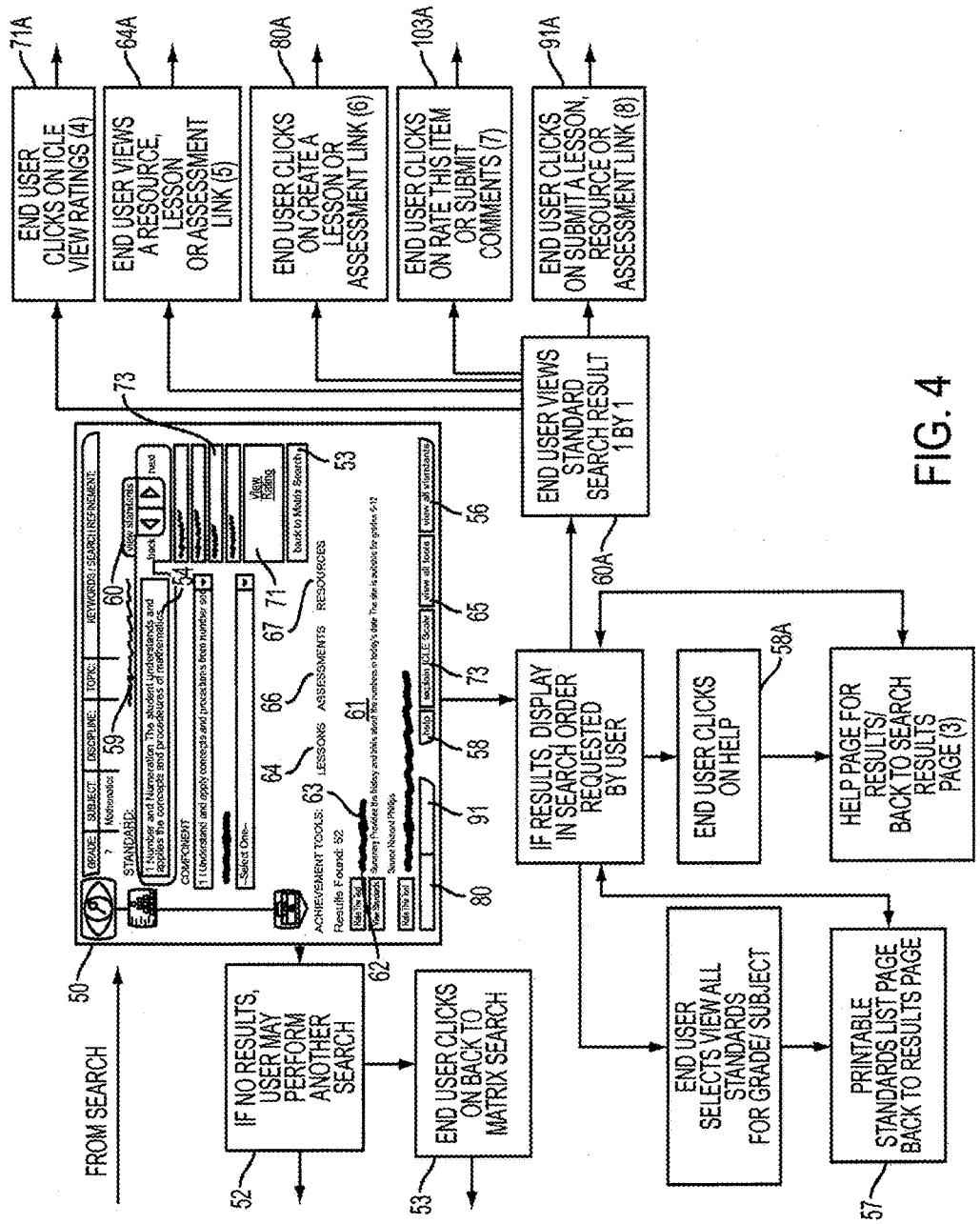

The screen 50 seen in FIG. 4 presents the user with a number of options which are outlined in FIG. 4 in a flowchart form. The screen includes a heading at the top of the screen 50 identifying the pertinent school district of the user. This data is derived from profile information about the user stored at the server 18 and made available for display when the user logs on with his or her unique user id. This data is also used to identify the appropriate state standard, or its refinement into a localized standard applicable to the user's school district. In the event that the search results turn up no standards pertinent to the search criteria, the user can click on "Back to Matrix Search" 53 to perform another search. If the user so selects, by clicking on "Search Again", box 53, the user is returned to the screen 40 to begin a new search.

Assuming that search results are attained, they are displayed in the screen 50 shown in FIG. 4. The top of the screen shows the grade and subject, as well as discipline and topic, if appropriate, of the search criteria.

The standard found pertinent to the search criteria is displayed in the format and 15 wording of the user's applicable standard, in a box 54.

From this screen the user may also click a view all standard 56 and have displayed a list of all of the standards available for printing in flowchart box 57 (screen not shown).

If the user is having difficulty, he or she can click a help button 58 and be displayed further detailed operating instructions using the loop 58a shown in FIG. 4.

The user may also scrutinize the standard which turned up a response to the inquiry. There may be a number of such standards indicated at 59, and the user may view additional standards one by one, moving forwardly and backwardly, using back and next keys 60 as reflected by loop 60a. Whichever standard is displayed will also have displayed at the bottom area 61 of the screen 50 selected ones of lessons, assessments, or resources associated with that standard. In the view depicted in FIG. 4, lessons appropriate to the standard are shown as a result of clicking on the lesson tab 64. This then displays summaries 63 together with a link 62 which would take the user to a new browser window displaying the lesson. Also included are rating information such as ICLE information (see below) in box 73. Alternatively, the user can click the "view all tools" button 65 and see all the achievement tools applicable to the standard. Of course, the arrangement of the elements displayed in the screen can vary widely from the specific display shown.

Also within the area 61 are tabs 66 and 67 permitting the display of assessment 66 and resource information 67 comparable to the display available for the lessons seen in FIG. 4. The flow of the program to activate or use the resource, lesson or assessment is seen more clearly in FIG. 5 signified in FIG. 4 as box 64a.

Figure 5:
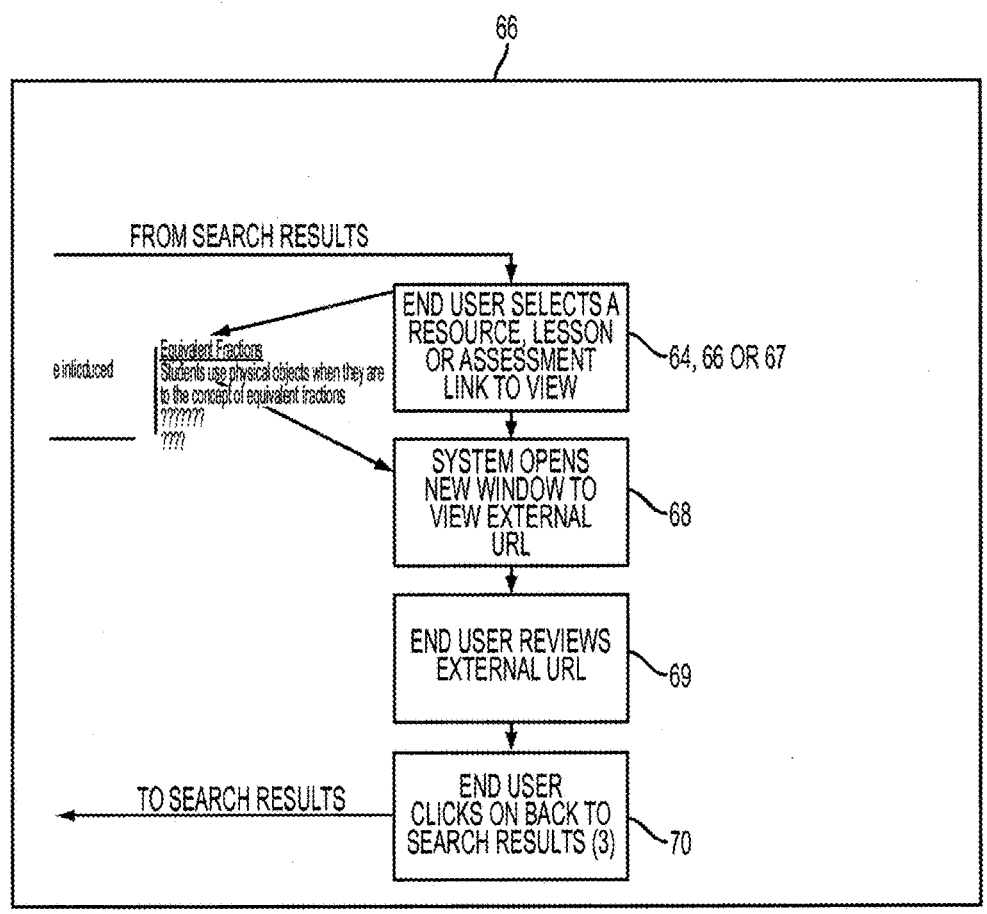

Referring now to FIG. 5, the flow is shown by a user clicking on a lesson 64, assessment 66, or resource 67 which causes the server to open a new browser window and display an external URL associated with the lesson, assessment or resource in box 61. FIG. 5 shows as an example the user clicking on a lesson denominated as "equivalent fractions" described as "students use physical objects when they are introduced to the concept of equivalent fractions." When the user thus is linked to the external URL, the facilities, capabilities and information available at that URL are displayed at the user's computer for use, as seen in box 69. When the user wishes to return to the program, he or she may close out of the new browser window 70 to return to the search result. He or she can then back key more to return to the search results.

ICLE Ranking of Standards

When the user selects the lowest level associated with a standard, an ICLE ranking will display for the tested grade levels in the user's state in math, science and English/language arts. The International Center for Leadership in Education (ICLE) has prioritized standards at tested grade levels as they relate to occurrence on state tests and the essential skills needed after graduation. A "high", "medium" or "low" on SURVEY indicates the priority of 35 skills most important for the high school graduate. A "high," "medium" or "low" on TEST indicates the likelihood of a standard being addressed on the state test. A "high", "medium" or "low" on PRIORITY is the combination of these two rankings.

SURVEY: The International Center for Leadership in Education developed and conducted the Curriculum Survey of Essential Skills. Over 20,000 teachers, administrators, other educators, business representatives and community members have participated. ICLE reviewed state academic standards from across the United States and developed a "topic statement list" for English/language arts, science and mathematics. There are approximately 100 topic statements for each instructional area. The surveyed participants were asked to identify the 35 topic statements they thought were the most important for a high school graduate. A "high" score means the Curriculum Survey participants, making it a high community expectation, ranked that standard in the top ⅓ of the Essential Skills. A "medium" ranking means the Curriculum Survey participants ranked the standard in the middle third of the Essential Skills. A "low" ranking means that standard was ranked in the bottom third of the Essential Skills by the Curriculum Survey participants.

TEST: Some states have a very close connection between their state standards and their state assessments. In other states, less than 30% of the state standards are assessed. When educators are told the state standards are all a priority, then none become a priority. The TEST ranking assists educators to identify the high priority state standards and offer associated instructional material for the teacher. A "high" ranking means there is a high probability that several questions that relate to this standard will appear on the state assessment. A "medium" means that one question that relates to this standard may appear on the state test. A "low" means that no questions relating to the standard were found on the test.

PRIORITY: This field averages the state assessment correlation ("high," "medium," "low") with the Curriculum Survey of Essential Skills national data to identify an overall priority for the specific learning target associated with a standard. A high priority indicates there will likely be several questions on the state assessment that relate to the standard and it has been ranked in the top ⅓ Essential Skills by the Curriculum Survey participants. A medium priority indicates there will likely be at least one question on the state assessment that relate to the standard and is not matched to the Essential Skills. A low priority means there will not likely be a question on the state assessment that relate to the standard and is ranked in the bottom third of the Essential Skills by the Curriculum Survey participants. More information about the International Center for Leadership in Education may be found at: http://www.daggett.com.

Other ranking criteria and authorities may be substituted.

Figure 6:
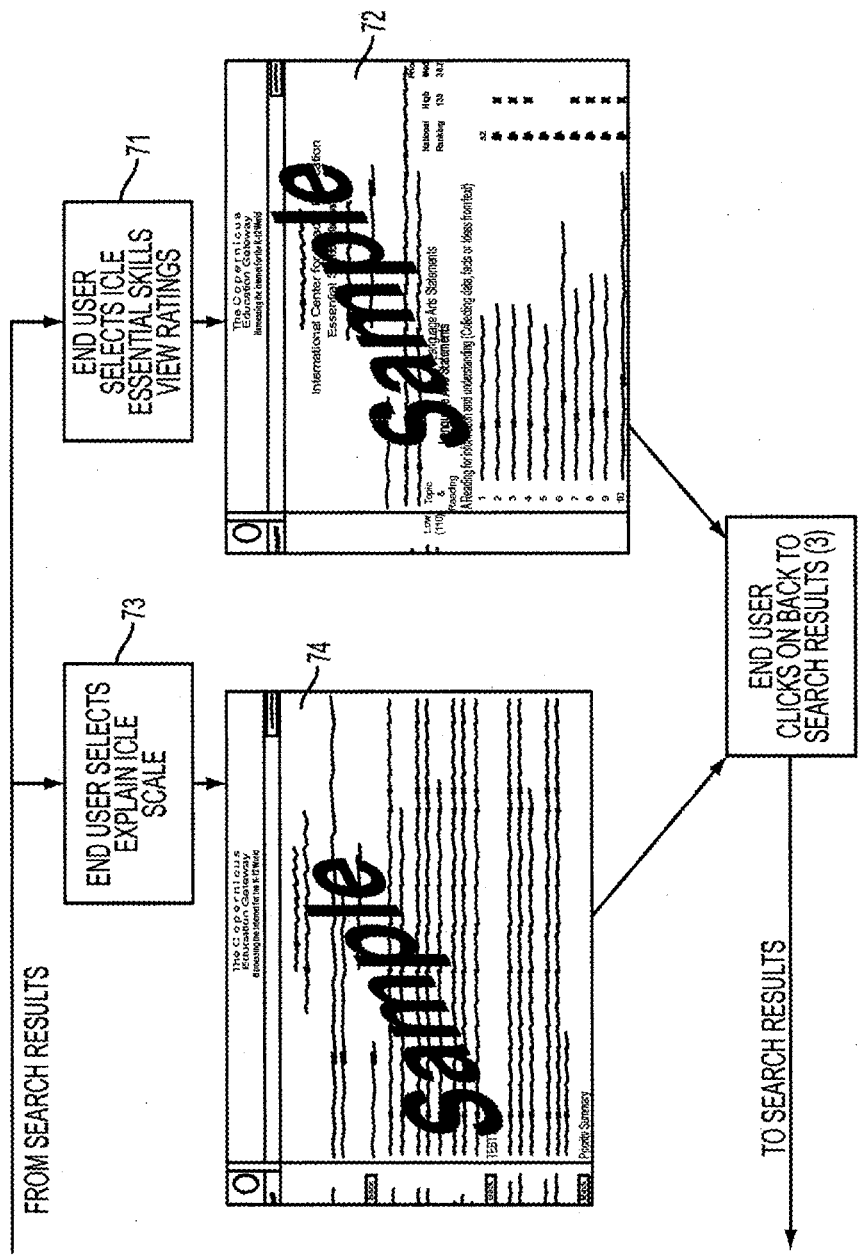

Access to information about the ICLE ranking of a standard is set forth at item 73 on the screen 50 as seen in FIG. 4. The clicking on the Essential Skills Rating "view rating" button 71 then leads to display 72 showing the essential skills rankings for the depicted standard, taking the operation through loop 71a as seen in FIG. 4 and amplified in FIG. 6. Alternatively, if user clicks on "Explain ICLE Scale" 73, he or she is shown the screen 74 depicted on FIG. 6 giving the appropriate definitions. From screen 72 or 74, the user may click his or her back button to return to the search result screen.

Figure 9:
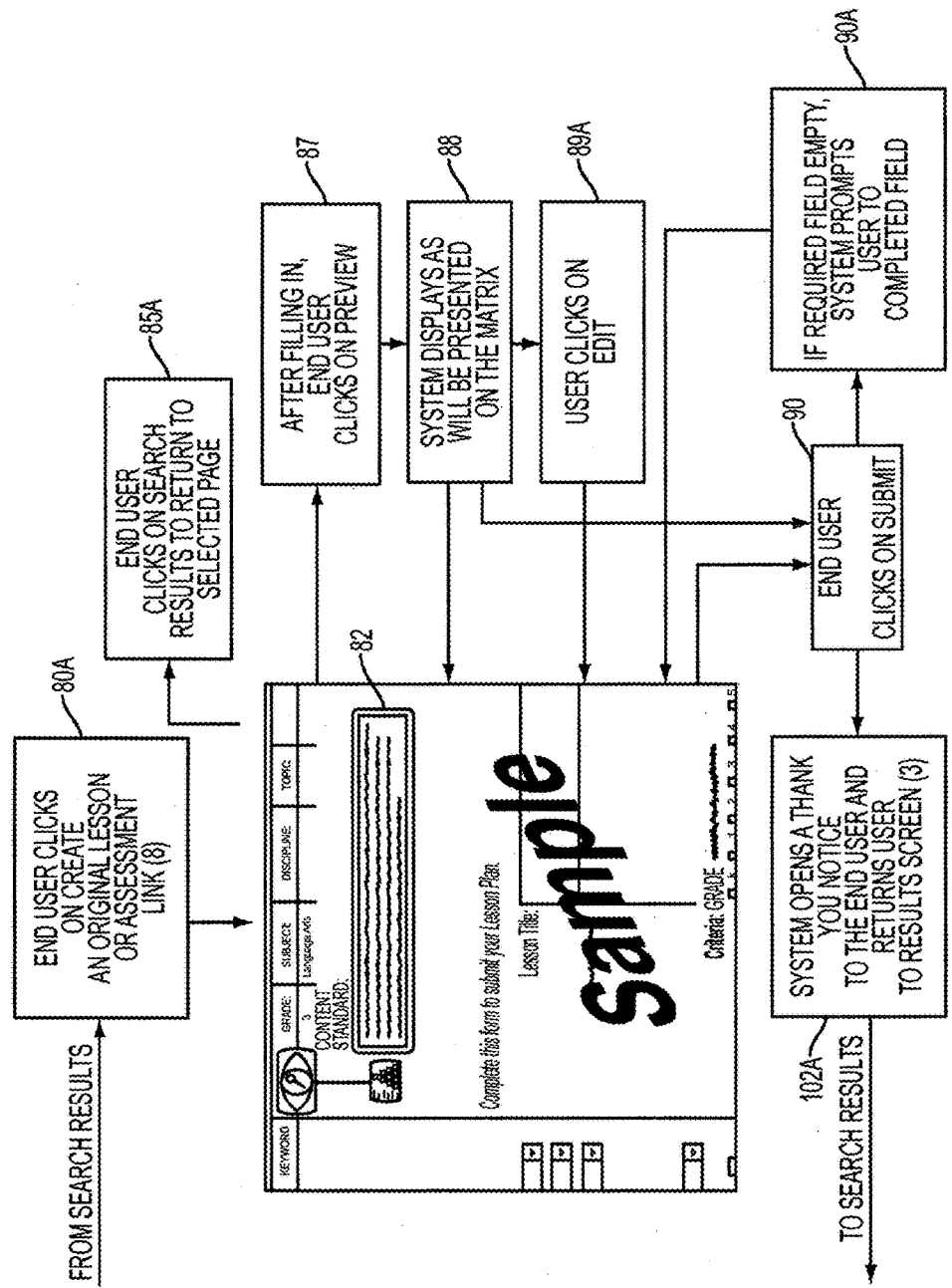
Figure 10:
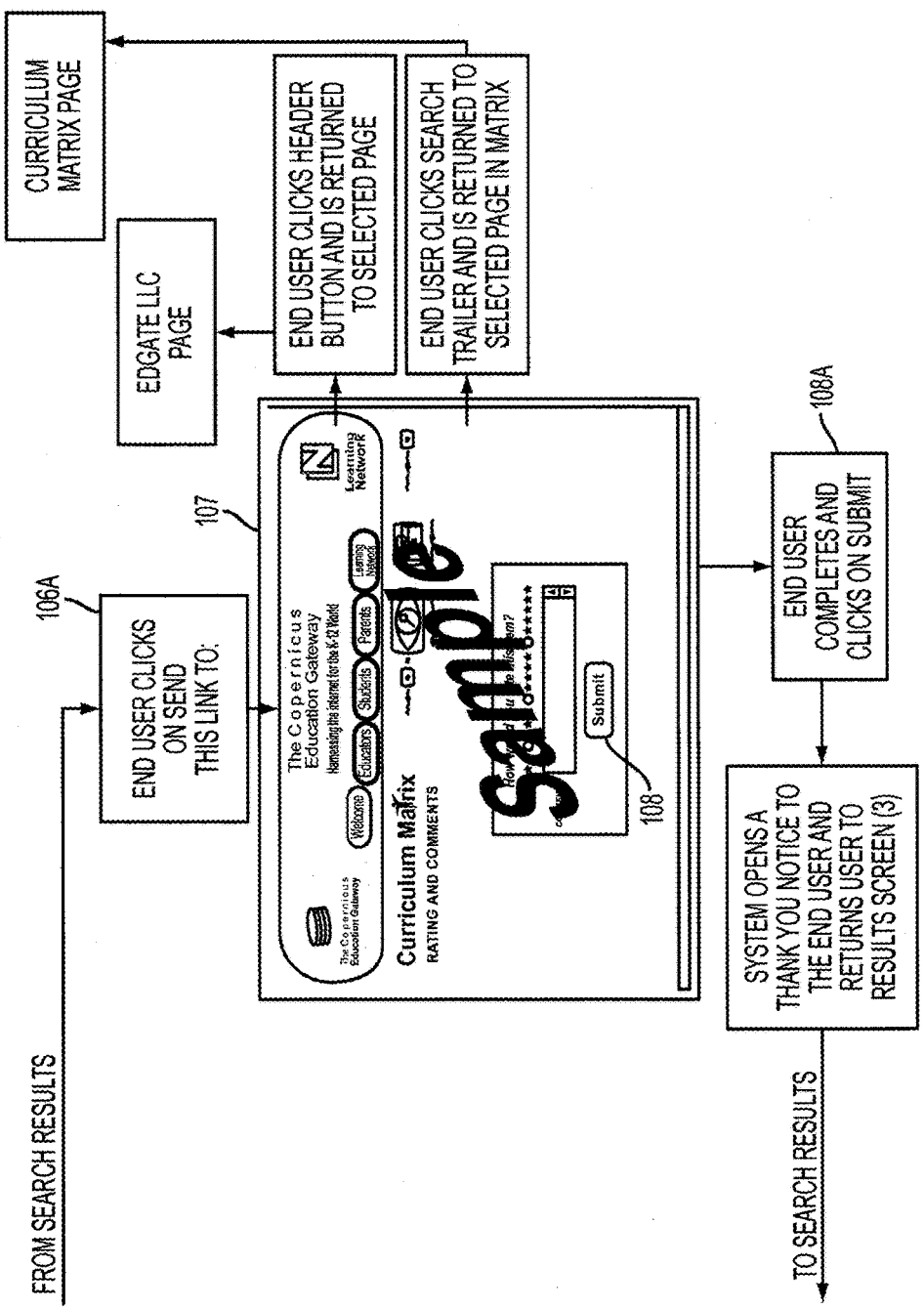

Returning again to FIG. 4, if the user clicks on the "create a lesson" 80 shown as flow chart box 80a, he or she is shown a screen 82, as seen in FIG. 9. Alternatively, if the user is in the assessments mode and clicks a comparable button, he or she is taken a similar screen for creating assessments. If at either screen, the user wants to return to the screen 50, he or she merely clicks on the search results button at the top of the screen 82. The screen 82 shows the applicable standard to which the submitted lesson, resource or assessment is to be linked and data entry blocks throughout the screen 82 to permit the entry of a short title and summary of the linked lesson, resource or assessment, as well as an indication of the applicable grade levels. The user also completes all the appropriate fields in the creation of the lesson or assessment achievement tool. A user can click on a preview button 87, which provides a preview screen 88 that provides the user with the opportunity to edit the screen (step 89a). Alternatively, if the user is happy with the display on the screen 88, the user may click the submit button 90 to submit the link lesson or assessment. If there are errors in the submitted screen, the system can evaluate the submission in box 90a and prompt user to complete any needed fields. If there are no errors, the system shows the submitter a thank you screen in box 102a and returns the user to the screen shown in FIG. 4.

Figure 8:
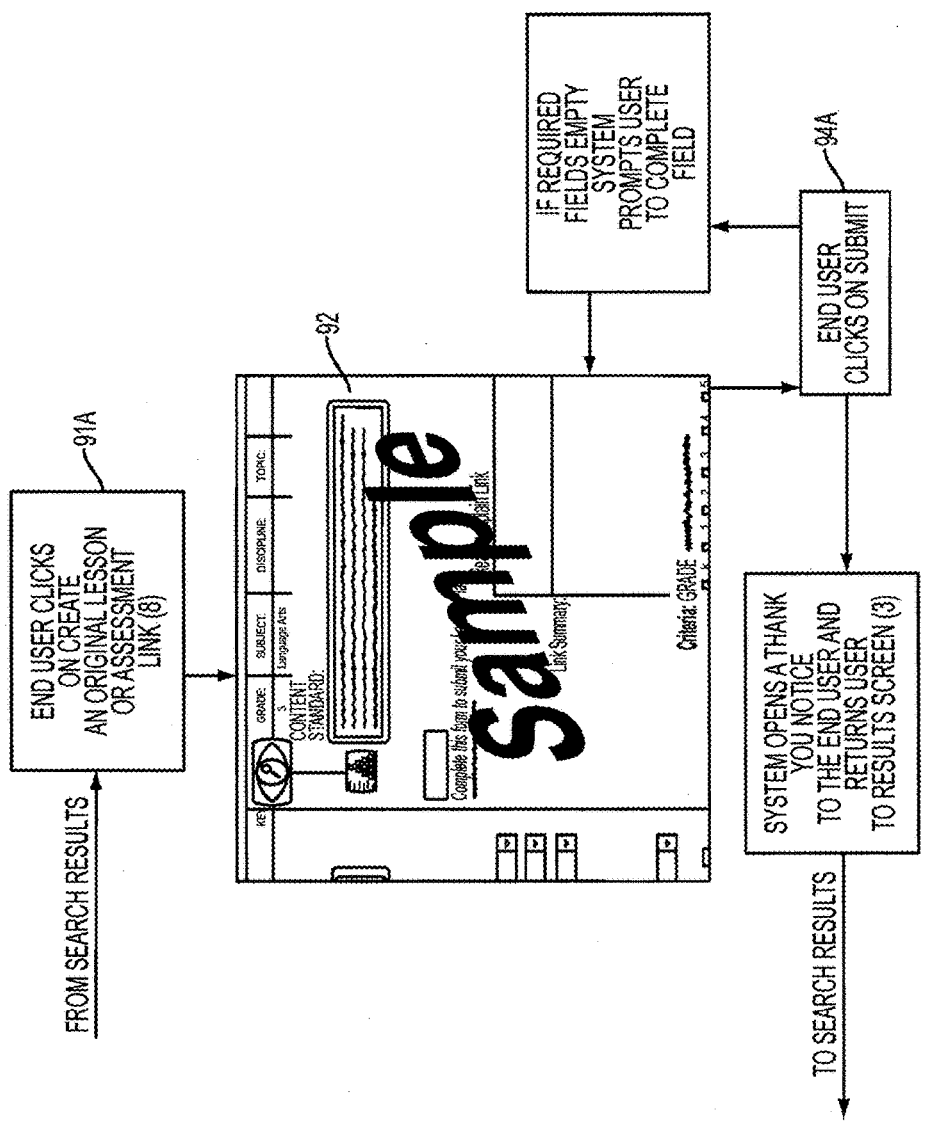

The user may also submit a preexisting Achievement Tool for a standard by use of loop 91a as seen in FIG. 4, which triggers the sequence seen in FIG. 8. If the user clicks on the "submit a link" button 91 shown as flow chart box 91a, he or she is shown a screen 92, as seen in FIG. 8. The screen 92 shows the applicable standard to which the submitted lesson, resource or assessment is to be linked and data entry blocks throughout the screen 92 to permit the entry of a short title and summary of the linked lesson, resource or assessment, as well as an indication of the applicable grade levels. The user also completes all the appropriate fields in the submission of a link to a lesson, assessment or resource achievement tool. The user may click the submit button 92a to submit the link lesson or assessment. If there are errors in the submitted screen, the system can evaluate the submission in box 93 and prompt user to complete any needed fields. If there are no errors, the system shows the submitter a thank you screen in box 94 and returns the user to the screen shown in FIG. 4.

As can be appreciated, because a standard has been associated with the submitted lesson, resource or assessment (whether through loop 91a or 80a), the server 18 may automatically store in a database the appropriate pointers to the lesson, resource in the assessment link, together with the keywords, grade and subject of the linked standard. Therefore, the keywords are then associated with the submitted lesson, resource or assessment link. The commonality of such keywords with any other standard can cause an association of the submitted lesson, resource or assessment with any such other common keyword standard.

Alternatively, the automatically linked keywords of the standard can be considered a "first draft" of the keywords, which are then reviewed by experts such as those at computer 12, who have the authorization level to add, delete or modify the keywords for the submitted lesson, assessment or resource. Alternatively, and preferably, if the experts deem that the submitted lesson, resource or assessment is inappropriate, it can be de-linked altogether.

Figure 7:
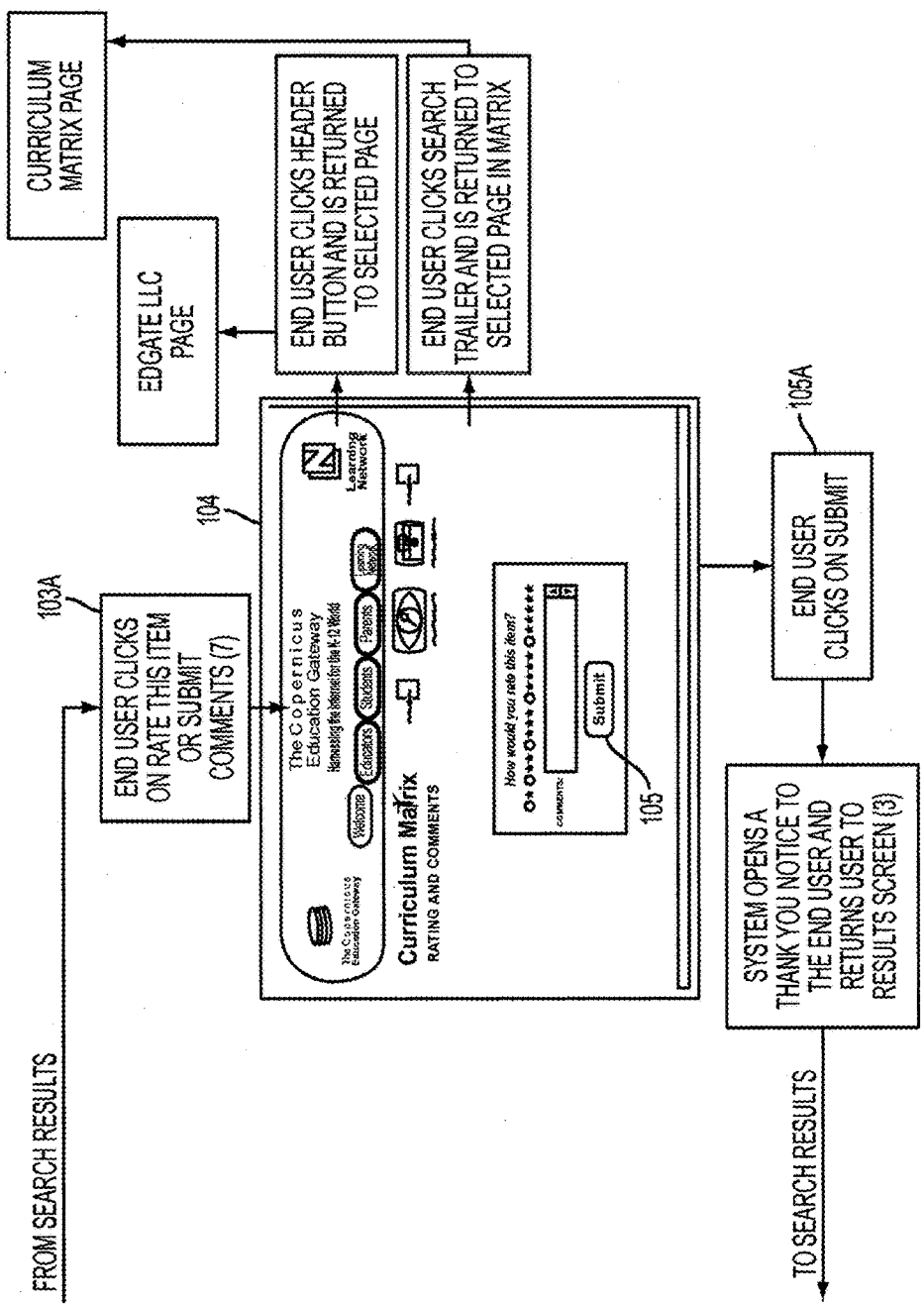

The system also permits the user to rate an achievement tool in a step 103a shown in FIG. 4. This presents user with a screen 104 as seen in FIG. 7. The user can rate item with 1 to 5 stars and add comments in the text box and submit, using the submit button 105 shown as being clicked in flow box 105a.

How it Works

Figure 11:
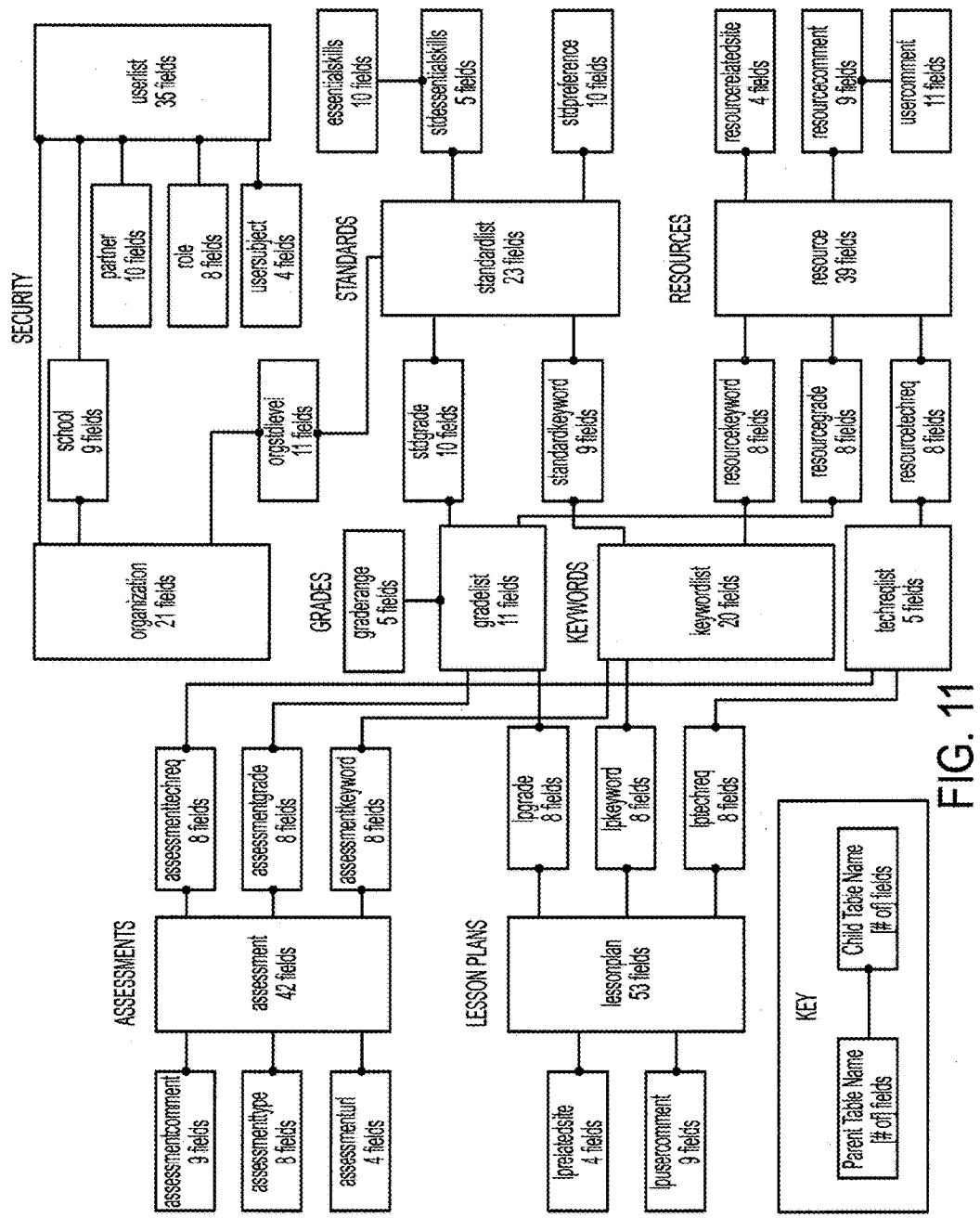
FIG. 11 is a schematic view of a database or table structure useful in the invention.
Figure 11A:
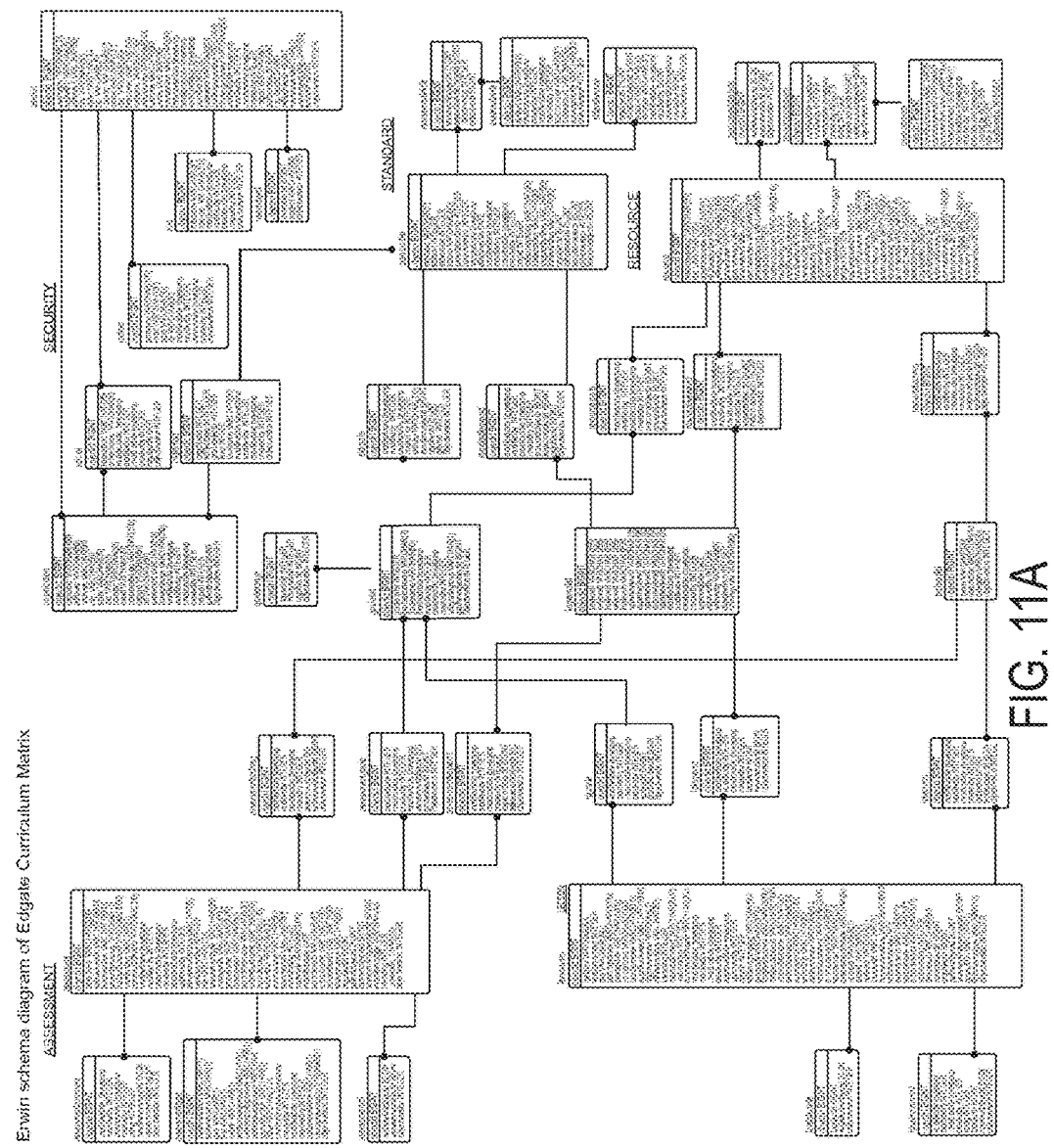
FIG. 11a is an Erwin schema diagram of the databases of FIG. 11, showing the field names and types.

The preferred embodiment presents each state's standards with the same structure and wording used by that state. Each standard is associated with related lesson plans, assessments and resources, as seen in the abbreviated database schema of FIG. 11. The fields of the databases are identified in the fall Erwin Schema of FIG. 11a. As seen in FIG. 11, the databases or tables are grouped as "security", "standards," "keywords," "grades," "assessments", "resources" and "lesson plans." The "security" group identifies and provides information about permitted users and their access levels. The "standards" group lists the standards, and keywords and grades associated with each, as well as links to the ICLE data and ranks. The "grades" group links the standards to appropriate assessments, lesson plans or resources when the grade matching is successful. The "keywords" group links the standards to appropriate assessments, lesson plans or resources when the keyword matching is successful. In the preferred embodiment, both keyword and grade matching must be successful to make a link. The "assessments", "resources" and "lesson plans" groups are analogously arranged to one another providing associated keywords and grades to permit matching as indicated. They also include the substantive information needed to make links and provide the data displays indicated herein. Parent and child database relationships are indicated by the legend in the lower left of FIG. 11.

A flexible array of search options allows teachers to hone in on the precise topic, level and tools they need. Local administrators can customize the data bank of standards and associated lesson plans, assessments and resources to reflect local curriculum requirements with higher level of editing access accorded users of such computers 29. Local administrators and individual teachers can also add lesson plans, assessments or resources to the system and rate the quality of existing resources.

The collected standards, resources, assessments and lesson plans are continually updated through input from local teachers and subject managers and through frequent additions from content developers. This gives teachers a local framework and orientation to curriculum while exposing them to national resources to supplement their teaching.

Benefits for Teachers

Teachers gain invaluable benefits from using the system, including the ability to:
  Save time and increase productivity through one-stop access to standards and instructional tools.
  Correlate their curriculum to state and local standards.
  Clarify their understanding of state standards by viewing lesson examples.
  Streamline classroom preparation by finding lessons and resources that meet state requirements.
  Access assessments that are aligned with state standards.
  Incorporate additional resources into their existing lesson plans.
  Contribute their own lesson plans, assessments and resources.

Benefits for Parents and Students

Applicant's commercial embodiment gives parents and students the ability to:
  Identify state instructional standards.
  Understand the age-appropriate developmental requirements and sequencing for their children's education.
  Access lessons and resources that help in the completion of homework assignments.
  Tap into resources for independent study.

Benefits for Administrators

District superintendents, curriculum directors and other school administrators are provided for the ability to:
  Aggregate the highest quality educational materials from trusted and reliable sources.
  Provide teachers with tools that can help individualize instruction.
  Align curriculum and materials to state and local academic standards.
  Improve performance and ease test anxiety on state assessments using appropriate assessment tools.
  Customize curriculum and lesson plans to meet the needs of individual classrooms.
  Increase local community awareness and participation in building and sustaining successful schools.
  Provide prioritization of standards to assist in teacher evaluation and understanding of state assessments.

The applicant's commercial embodiment is a web-based educational product, which provides a framework for the correlation of lessons, resources and assessments to state standards. The technology that drives this framework is comprised of 1) a database to house content; 2) java programming which provides the code to initiate and complete operations; 3) a unique keyword system which "tags" lessons, resources and assessments that are available on the Internet to state standards and 3) html code to display the data in a user-friendly format; such as the screens depicted in the drawings.

The system employs a keyword system, which enables the correlation of lessons, resources, and assessments (Achievement Tools) to State Standards. Each subject has a master list of keywords, and a unique code has been established for that keyword. For example the following table exhibits keywords related to various science disciplines and topics:

| SC100 | Science | Life Science | Biology | DNA |
| SC101 | Science | Life Science | Biology | Fish |
| SC102 | Science | Life Science | Biology | Kingdom Classification Taxonomy |
| SC103 | Science | Life Science | Biology | Genetics |
| SC259 | Science | Life Science | Biology | General |
| SC104 | Science | Life Science | Biology | Health |
| SC105 | Science | Life Science | Biology | Heredity |
| SC106 | Science | Life Science | Biology | Human Body |
| SC107 | Science | Life Science | Biology | Insects |

Every state standard and all associated levels is "tagged" with the code: i.e. $7^{th}$ Grade Washington State Science Standard:

1.2.9. Molecular basis of heredity: Understand that all living things reproduce and pass on genetic information, and that an organism's characteristics are determined by both genetic and environmental influences. SC103 SC105
and
$7^{th}$ Grade California State Science Standard:

2.d. Students know plant and animal cells contain many thousands of different genes and typically have two copies of every gene. The two copies (or alleles) of the gene may or may not be identical, and one may be dominant in determining the phenotype while the other is recessive. SC103

Lessons, assessments and resources which are entered into the database or table and associated with a standard level will also display for ANY state standard which has the same keyword code. i.e. If a lesson is posted to $7^{th}$ Grade Washington 1.2.9 Science standard with keyword tag SCI03, this lesson will also display for California $7^{th}$ Grade Science standard 2.d which has the same keyword tag, namely SC103.

Figure 12:
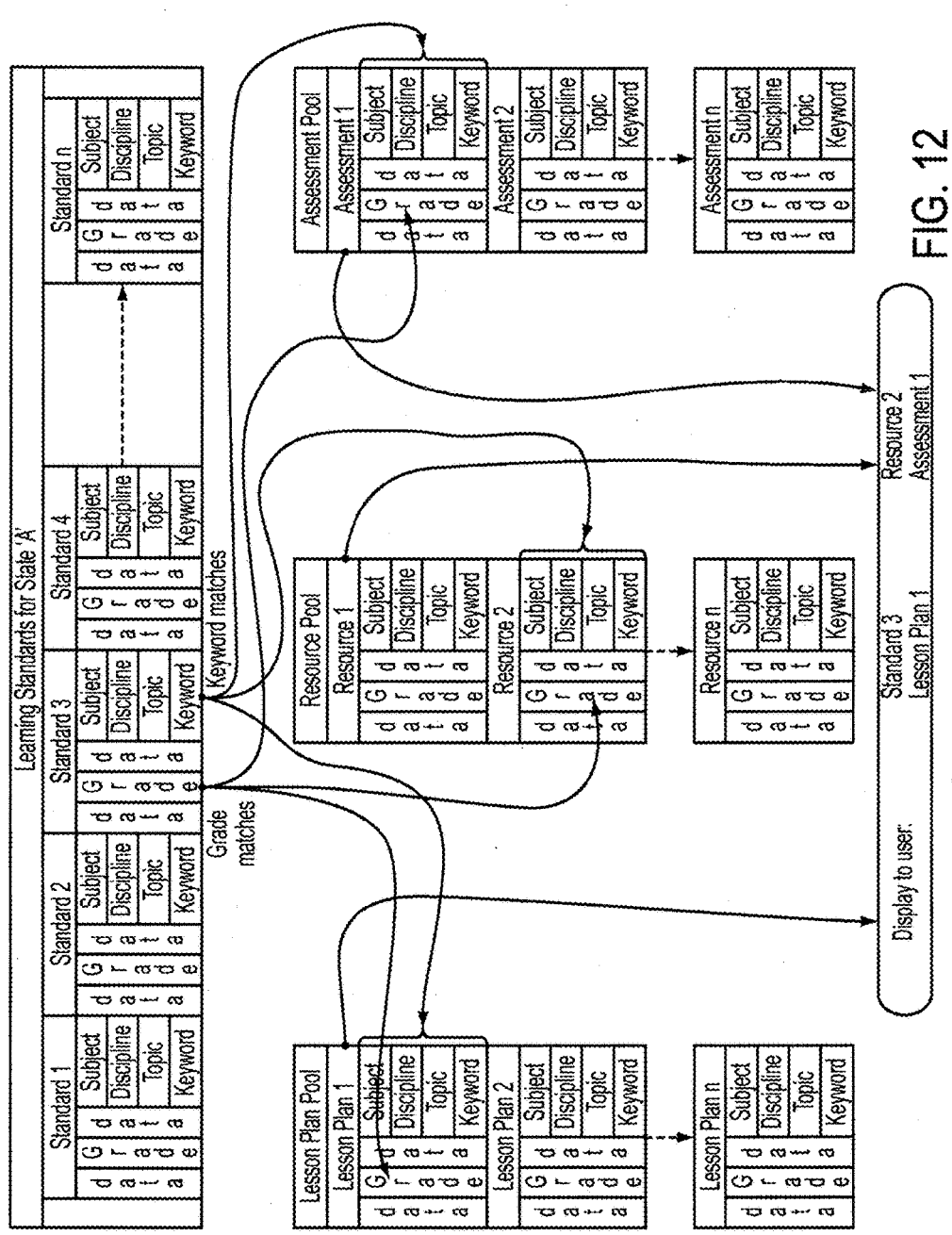
FIG. 12 is a schematic view of the way the tables can be linked by commonality of keywords.

Thus, as seen in FIG. 12 the standards are stored in databases identifying the state, locality, grade, and subject along with a set of keyword tags. A separate database or table can exist having the various Achievement Tools, namely lesson, assessments and resources, also identified with the appropriate keywords (including subject, discipline and topic). Then, when it is desired to display all of the lessons for a particular state standard, the keywords for the state standard are used to select from the database of Achievement Tools the lessons that share at least one keyword with the standard. Alternatively, if resources or assessments are desired, those matching the same keyword can be displayed and made available. A given Achievement Tool may be identified with keywords that appear in different subject hierarchies.

The system can also be operated in the reverse, such that if an achievement tool is the starting place of inquiry, the keyword for that achievement tool can be used as a certain criteria in the state standard to identify associated standard, identified as being pertinent by the commonality of the keyword. However, the selection of the achievement tool from state standards is likely to be the more common use.

Other key functional features of The Applicant's commercial embodiment are:
1. The Applicant's commercial embodiment is designed to work as a single database for all 49 states.
2. The User ID is associated with a specific state, which ensures display of the correct standards upon login. In addition, the User ID associates the user with a specific locality for Applicant's commercial embodiment.
3. Java programming and html code provides the instruction to display the state standards with the same structure and wording used by the state.
4. Applicant's commercial embodiment has an administrative system which allows the addition and modification of local learning standards to the state standards.
5. Any user may add lessons and resources to the database.
6. Any lesson, resource or assessment may display on all users computers if approved by an administrator at computer 14.
7. Standards and associated levels include a ranking of High, Medium or Low, which has been determined by professional educators at the International Center for Leadership in Education at, for example, computer 12.
8. State standards and levels may be updated or changed by an administrator at computer 14 who has the ability to edit any keyword tags associated with that standard.
9. Lessons, resources and assessments may display "cross-curricular" use and correlate to standards in multiple subject areas.

The applicant's commercial embodiment presents the standards in the same format and wording used by the state, and includes state-specific breakdowns, such as learning objectives and performance indicators.

To allow even further localization of the applicant's commercial embodiment, district administrators may be provide the ability to modify and add to the set of existing state standards with higher level access at computers 29. In addition, local managers can customize it by adding other standards or specifying more detailed goals directly related to the state standards.

Applicant's commercial embodiment includes simple online templates such as screens 92 (FIG. 9) that allow educators to create and upload original lesson plans and assessment tools, such as rubrics. This flexible system also allows submission of links to existing Internet based materials such as at screen 92, FIG. 8. When educators add materials, these items are automatically correlated and cross-referenced to all state standards, and are added to the database of resources from which users draw search results.

The applicant's commercial embodiment offers three methods for conducting a search: by typing grade or subject, by selecting from a predefined list of keywords or by typing in a word or phrase. Once users have entered their search criteria, they can search for standards or lesson plans, achievement tools, and Web resources. Each of these items is linked to standards. In addition, the applicant's commercial embodiment allows you to opt "View All Standards," a feature that generates a Web page that lists all standards associated with the grade level and subject matter specified in your search criteria.

The applicant's commercial embodiment database is post-Gres, SQL 92 compliant, which is transferable to an Oracle environment. PostgreSQL is a sophisticated Object-Relational DBMS, supporting almost all SQL constructs, including subselects, transactions, and user-defined types and functions. The applicant's commercial embodiment may also be migrated to other technologies such as Microsoft SQL server, which will allow greater flexibility in the marketplace.

Glossary

As Used Herein, the Following Terms are Defined as Noted:
Achievement Tools: Lessons, assessments and resources, which relate directly to a specific standard on the database.
Assessment: An instrument to evaluate learning such as a test, portfolio or teacher-generated essay.
Browser: Short for Web browser; this is the software that allows a user to view Web pages and surf the World Wide Web. The most popular Web browsers are Netscape Navigator and Microsoft's Internet Explorer.
Local Administrator: The person designated by the school/school district to be responsible for the overall management of localized refinements of the database and state standards.
Subject Managers: Local educators designated by a Local Administrator to review lessons, assessments and resources about specific topics submitted by users.
ICLE: The International Center for Leadership in Education based in Albany, N.Y. This organization has developed a survey instrument, which ranks the importance of specific state standards and their relationship to the state test. ICLE has also developed a framework to evaluate the rigor and relevance of an Achievement Tool.
Keyword: A meaningful word or phrase that can be used to search the database.
Lesson: A set of procedures to teach a specific unit of study. Generally a lesson will include step-by-step procedures, assessment, materials and teacher notes.
Link Submission Form: The form that you use to submit a lesson, assessment or resource relating to a specific academic standard to the database.
Login: The process of typing in a User ID and Password to access the system.
Rank: The assigned importance of a standard based on the ICLE essential skills survey and the ICLE probability with relationship to the state test.
Rating: A star rating from one to five stars that a user assigns to a lesson, resource or assessment on the database. Star ratings reflect the overall quality of the link. A user can submit a rating for an individual achievement tool by using the Rate This Item button, available from the Search Results page.
Resource: A link to a Web site to help a teacher meet a specific standard.
The Preferred Embodiment has the Following Attributes:
1) The preferred embodiment not only displays lessons but also supplemental Internet resources and Assessments correlated to standards.
2) The interface enables the user to get to information far more efficiently than other systems.
3) Lessons, resources and assessments submitted by a user are directly correlated to relevant standards.
4) Any local lesson, resource or assessment submitted by a user and approved by the Local Administrator is displayed at the top of the search results.
5) The user has the ability to select either a standards-based search or an Achievement Tools Search not just one or the other.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus comprising:
a server computer comprising memory, wherein the memory centrally stores:
a plurality of keywords;
a plurality of standards;
a plurality of user tools;
keyword-to-standard assignments, wherein each of the standards has assigned thereto at least selected ones of the keywords; and
keyword-to-user-tool assignments, wherein each of the user tools has assigned thereto at least selected ones of the keywords;
wherein the server computer is operable to:
publish, over a computer network, a user interface that enables standard selection, wherein the user interface is configured to enable user log-in via a unique identifier;
receive, over the computer network and via the user interface, a selection of a standard from the plurality of standards;
identify each user tool of the plurality of user tools that has at least one keyword in the at least selected ones of the keywords assigned to the user tool that is also within the at least selected ones of the keywords assigned to the selected standard; and
provide, over the computer network and via the user interface, a set of one or more user tools applicable to the selected standard based, at least in part, on the identification.

2. The apparatus of claim 1, wherein the server computer is operable to:
receive, over a computer network and via the user interface, a selection of a particular standard of the plurality of standards in relation to a submitted user tool; and
in the memory, automatically assign to the submitted user tool the at least selected ones of the keywords assigned to the particular standard.

3. The apparatus of claim 1, wherein the server computer is operable to:
receive, over the computer network and via the user interface, a keyword-assignment revision with respect to a particular user tool of the plurality of user tools; and
in the memory, revise the at least selected ones of the keywords assigned to the particular user tool based, at least in part, on the received keyword-assignment revision.

4. The apparatus of claim 1, wherein the standards are defined by discrete jurisdictions to apply to processes within those jurisdictions.

5. The apparatus of claim 4, wherein the standards defined by one discrete jurisdiction have similarities to the standards of a different discrete jurisdiction and the keywords assigned to such similar standards are the same.

6. The apparatus of claim 1, wherein at least some of the user tools are generated by users in diverse jurisdictions having differing standards.

7. The apparatus of claim 6, wherein the server computer is operable to revise the at least selected ones of the keywords assigned to at least one user tool of the plurality of user tools subsequent to submission of the at least one user tool.

8. The apparatus of claim 1, wherein, as a user tool is user-submitted for a standard of the plurality of standards, keywords assigned to that standard are automatically assigned to the user-submitted user tool.

9. The apparatus of claim 1, wherein the server computer is operable to:
permit a user of the apparatus to input a rating for at least one user tool of the plurality of user tools; and
store the input rating for display in association with the at least one user tool.

10. The apparatus of claim 1, wherein the server computer is operable to provide a website user interface for enabling a user to access the apparatus over a network.

11. The apparatus of claim 1, wherein the server computer is operable to provide a user interface that enables an administrator to select only standards pertinent to a user for use by the user.

12. The apparatus of claim 1, wherein the server computer is operable to filter the standards such that a user is provided only standards deemed pertinent to that user.

13. The apparatus of claim 1, wherein the standards comprise educational standards.

14. A method comprising, by a server computer:
centrally storing a plurality of keywords, a plurality of standards and a plurality of user tools;
centrally storing keyword-to-standard assignments, wherein each of the standards has assigned thereto at least selected ones of the keywords;
centrally storing keyword-to-user-tool assignments, wherein each of the user tools has assigned thereto at least selected ones of the keywords;
publishing, over a computer network, a user interface that enables standard selection, wherein the user interface is configured to enable user log-in via a unique identifier;
receiving, over the computer network and via the user interface, a selection of a standard from the plurality of standards;
identifying each user tool having at least one keyword in the at least selected ones of the keywords assigned to the user tool that is also within the at least selected ones of the keywords assigned to the selected standard; and
providing, over the computer network and via the user interface, a set of one or more user tools applicable to the selected standard based, at least in part, on the identification.

15. The method of claim 14, comprising:
receiving, over the computer network and via the user interface, a selection of a particular standard of the plurality of standards in relation to a submitted user tool; and
automatically assigning to the submitted user tool the at least selected ones of the keywords assigned to the particular standard.

16. The method of claim 14, comprising:
receiving, over the computer network and via the user interface, a keyword-assignment revision with respect to a particular user tool of the plurality of user tools; and
revising the at least selected ones of the keywords assigned to the particular user tool based, at least in part, on the received keyword-assignment revision.

17. The method of claim 14, wherein the standards are defined by discrete jurisdictions to apply to processes within those jurisdictions.

18. The method of claim 17, wherein the standards defined by one discrete jurisdiction have similarities to the standards of a different discrete jurisdiction and the keywords assigned to such similar standards are the same.

19. The method of claim 14, comprising revising the at least selected ones of the keywords assigned to at least one user tool of the plurality of user tools subsequent to submission of the at least one user tool.

20. A computer-program product comprising a non-transitory computer-usable medium having computer-readable program code embodied therein, the computer-readable program code adapted to be executed to implement a method comprising:

centrally storing a plurality of keywords, a plurality of standards and a plurality of user tools;

centrally storing keyword-to-standard assignments, wherein each of the standards has assigned thereto at least selected ones of the keywords;

centrally storing keyword-to-user-tool assignments, wherein each of the user tools has assigned thereto at least selected ones of the keywords;

publishing, over a computer network, a user interface that enables standard selection, wherein the user interface is configured to enable user log-in via a unique identifier;

receiving, over the computer network and via the user interface, a selection of a standard from the plurality of standards;

identifying each user tool having at least one keyword in the at least selected ones of the keywords assigned to the user tool that is also within the at least selected ones of the keywords assigned to the selected standard; and providing, over the computer network and via the user interface, a set of one or more user tools applicable to the selected standard based, at least in part, on the identification.

\* \* \* \* \*